United States Patent [19]
Davegårdh et al.

[11] 3,880,941
[45] Apr. 29, 1975

[54] METHOD IN THE RECOVERY OF TRINITRO-METHANE(NITROFORM) FROM A MIXTURE OF TRINITROMETHANE, NITRIC ACID AND WATER

[75] Inventors: Carl August Ragnar Davegårdh, Nora; Gustav Allan Wetterholm, Gyttorp, both of Sweden

[73] Assignee: Nirto Nobel AB, Gyttorp, Sweden

[22] Filed: Apr. 30, 1973

[21] Appl. No.: 356,991

Related U.S. Application Data

[63] Continuation-in-part of Ser. No. 341,075, Dec. 11, 1972, abandoned.

[30] Foreign Application Priority Data
Sept. 5, 1972 Sweden.......................... 11446/72

[52] U.S. Cl.................................... 260/644; 203/95
[51] Int. Cl.............................................. C07c 79/14
[58] Field of Search...................... 203/95; 260/644

[56] References Cited
UNITED STATES PATENTS
2,658,084  11/1953  Wetterholm et al............. 203/95 X

*Primary Examiner*—Leland A. Sebastian
*Attorney, Agent, or Firm*—Fred Philpitt

[57] ABSTRACT

A method in the recovery of trinitromethane in the form of an aqueous solution from a solution containing nitric acid, water and trinitromethane, the solution containing a smaller quantity of nitric acid than that corresponding to the nitric acid content of an azeotropic mixture of nitric acid, water and trinitromethane, wherein it is ensured that the solution contains so much water that the distilled mixture of trinitromethane and water obtains a content of approximately 35 % or lower trinitromethane and a content of approximately 65 % or more water, and the remaining nitric acid solution obtains a composition of approximately 67 % nitric acid ($HNO_3$) and approximately 33 % water (maximum azeotrope in the system nitric acid-water).

2 Claims, 1 Drawing Figure

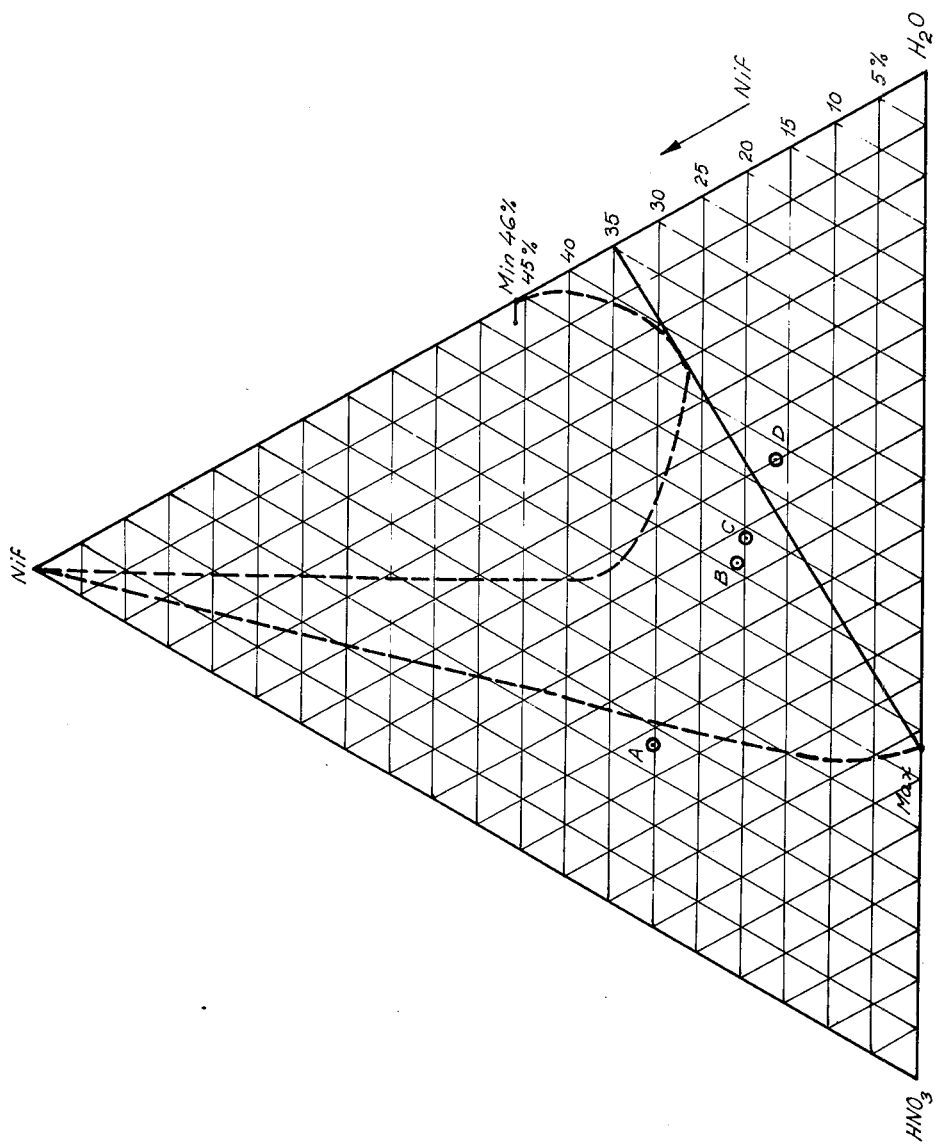

METHOD IN THE RECOVERY OF TRINITRO-METHANE(NITROFORM) FROM A MIXTURE OF TRINITROMETHANE, NITRIC ACID AND WATER

RELATED APPLICATION

This application is a continuation-in-part of our prior application Ser. No. 341,075, filed Dec. 11, 1972, and now abandoned.

The present invention relates to a method in the recovery of trinitromethane (nitroform) from a mixture of trinitromethane, nitric acid and water, the mixture containing a minor quantity of nitric acid than that corresponding to the azeotropes in the system nitric acid-trinitromethane-water.

In the preparation of trinitromethane by oxidation of acetylene with concentrated nitric acid, there is obtained a reaction solution containing, in addition to the trinitromethane, also residual, unreacted nitric acid and water. The reaction solution contains more nitric acid than that corresponding to the azeotrope line in the system nitric acid-trinitromethane-water. When recovering trinitromethane from the reaction solution, the first step taken is the expulsion of the surplus nitric acid, over and above the quantity corresponding to the nitric acid content of a corresponding azeotropic mixture. To this end, there is added a minor quantity of water to the residual solution of trinitromethane such that the concentration of nitric acid is lower than that corresponding to the ratio of the azeotropic mixture, whereupon the trinitromethane can be distilled off together with the water present in the diluted solution obtained. It is also possible to exclude the step of expelling excess nitric acid, and to add directly a quantity of water sufficient to pass the azeotrope line.

It is previously known that a mixture of trinitromethane and water forms a solubility gap, from a composition of 46 % trinitromethane, 54 % water and upwards to the proximity of pure trinitromethane (95 % trinitromethane/5 % water). The reaction solution freed from the excess nitric acid has hitherto been mixed with so much water that the distillate comprising trinitromethane and water obtains a composition which in every case lies theoretically on the water side of the solubility gap in the system trinitromethane-water. It has been found in practice that if an attempt is made, as is natural, to obtain a 45 % solution of the trinitromethane in water, a subphase comprising approximately 95 % trinitromethane dissolved in water is obtained at the same time. This portion of the distillate, which is much heavier than water, is collected in the lower portion of the receiver. Tests made with either a pure subphase or a mixed top-phase-bottom phase in the relationship 1—1 have shown that both phases are explosive and can be detonated with a detonator number 8. Thus, a test effected with a pure bottom phase in accordance with Kast's deformation test, in which 35 grams of sample were detonated on top of a 1 inch lead cylinder, there was obtained a deformation of 24 mm average. The mixture top phase - bottom phase gave in corresponding tests an upsetting of 16 mm, while a pure top phase gave no deformation. Thus, the tests showed that formation of the bottom phase in the distillation processes is accompanied with certain risks of explosive decomposition.

It has now been found possible to considerably increase the degree of safety when recovering trinitromethane by distillation from a mixture comprising trinitromethane, nitric acid and water if the water content is adjusted to a valve of such magnitude that the distillated mixture of trinitromethane and water obtains a trinitromethane content of approximately 35 % or less and approximately 65 % or more water, and the remaining nitric acid solution obtains a composition of approximately 67 % nitric acid ($HNO_3$) and approximately 33 % water (the maximum azeotrope in the system of nitric acid-water). The invention is based on the fact that the solubility gap in the three phase system trinitromethane-water-nitric acid has been found to have an extremely abrupt outward bulge beneath the solubility gap of the system trinitromethane-water. The condition can be illustrated by means of the accompanying drawing, which illustrates a triangular graph of the three-phase system trinitromethane-nitric acid-water. The trinitromethane is shown in the graph by the abbreviation Nif (nitroform), and nitric acid and water respectively by their chemical formulii.

The point Max on the line $HNO_3$—$H_2O$ is the maximum azeotrope for the system $HNO_3$—$H_2O$ (67 % $HNO_3$/33 % water) and the line Nif-Max identifies the locality of the maximum azeotropes in the system Nif—$HNO_3$—$H_2$). If the composition of a mixture of nitroform, nitric acid and water is located to the left of the line Nif-Max, the distillate will comprise nitric acid. Thus, if a mixture having a composition falling to the left of the azeotrope line of the system in question is subjected to distillation, pure nitric acid will first depart, until the composition in the distillation column has reached a composition on the azeotrope line. In order to recover trinitromethane, there is added a minor quantity of water, so that the composition of the mixture trinitromethane, nitric acid and water will lie to the right of the azeotrope line (Nif-Max). When distilling the mixture, a mixture of trinitromethane and water will depart, wherewith a mixture of nitric acid and water of azeotropic composition remains as a residue (the composition Max in the graph). It has not previously been observed that the solubility gap of the system Nif—$HNO_3$—$H_2O$ gives rise to a strong bulge beneath the solubility gap for the system trinitromethane-water, the limit of which extends approximately tangentially to a straight line passing between the point Max and the composition 35 % Nif/65 $H_2O$.

As will clearly be seen from the graph, when distilling the mixture to obtain a solution of nitroform in water having the composition 45 % Nif and 55 % $H_2O$, it is necessary to pass the two phase region in the system trinitromethane, nitric acid and water, with the aforementioned explosion risks as a result thereof. To avoid these risks in passing into the two phase region when distilling the reaction solution, the solution is diluted in accordance with the invention with at least so much water that the composition of the distillate and the obtained distillate residue passes along the line Max-35 % Nif/65 % $H_2O$ or beneath the same, e.g. along the line Max-30 % Nif/70 % $H_2O$.

In accordance with the invention a lower trinitromethane content of the distillate than normal is accepted in exchange for an increased degree of safety when effecting the distillation process.

It has surprisingly been discovered that the division into phases taking place when passing into the two phase region is irreversible, insofar as it is extremely difficult to cause the separated phases to remix together, although this is theoretically possible if the distillation line intersets the boundary line of the two phase region at two positions (e.g. with distillation from line C, Example 3 below). An acceptable safety limit can only be achieved it the distillation process is effected in accordance with the invention along a distillation line which does not intersect the boundary line of the two phase system at all.

With the invention it is possible to inspect the reflux in the column used for the distillation process while distillating trinitromethane, and to increase the quantity of water added too the refluxing system of the column if a two phase system is observed to occur in the reflux, until the two phase system has disappeared.

A clear understanding of the invention will be had from the following four examples, of which Examples 1, 2 and 3 are intended to illustrate the process effected in accordance with known methods and example 4 is intended to illustrate the process when effected by the safer proposed with the present invention.

EXAMPLE 1

When preparing trinitromethane by nitrating acetylene with concentrated nitric acid there was obtained a reaction solution which was freed from excess concentrated nitric acid by distillation. The residual solution had the following composition:
29.5 % trinitromethane
52.4 % nitric acid
18.0 % water.

The composition is denoted with the letter A in the accompanying triangular graph. The corresponding point is located to the left of the line Nif-Max (the azeotrope line in the three component system). When distilling the mixture, an unstable product having a high nitric acid content was obtained. The water content of the solution was too low to retain the nitric acid in the distillation vessel during the distillation process.

The process shows that it is impossible to recover a nitric acid free product from the recited composition.

EXAMPLE 2

The solution from Example 1 having the recited composition was admixed with 40 % water, whereupon the following composition was obtained:
21.1 % trinitromethane
37.5 % nitric acid
41.4 % water.

Upon continued distillation, a distillate was obtained comprising two phases, independent of reflux and the number of plates in the column. The heavier phase, comprising 90 % trinitromethane and remainder water, was detonatable.

This composition is denoted in the triangular graph with the letter B. The point is located to the right of the azeotrope line Nif-Max. When distilling from point B, the composition passes into the two phase region, where the mixture is divided into two phases.

EXAMPLE 3

The solution from Example 1 having the recited composition was diluted with 47.5 % water. The obtained solution then had the composition
20.0 % trinitromethane
35.8 % nitric acid
44.1 % water.

Upon continued distillation, a distillate having two phases was obtained, the heavier phase, comprising 90 % trinitromethane and remainder water, was detonatable. With long time mixing after withdrawal from the distillating apparatus, it was possible to convert the distillate to a single phase system, since the solubility of trinitromethane in water is 46 %. The distillate then had the composition
45.8 % trinitromethane
2.5 % nitric acid
51.7 % water.

The composition first mentioned in Example 3 is denoted in the triangular diagram with the letter C. When distilling from point C, the composition passes into the two phase region and is divided into two phases as a result thereof. Upon passing from the two phase system, however, an extremely long time is taken for the composition to reach a single phase. Although it is possible to obtain a distillate comprising a single phase by an infinitely small withdrawal and an infinitely large reflux and an infinitely large reflux, it is not possible, however, to escape the risk of the two phase system, since such a system would be found at a certain level in the distillation column where the two phases may be able to separate, e.g. in the case of a break down, and form a detonatable product.

EXAMPLE 4

The solution first mentioned in Example 3 was diluted with 20 % water to a solution having the following composition:
16.7 % trinitromethane
30.0 % nitric acid
53.4 % water.

When distilling this solution a single phase distillate was obtained having the composition:
30.0 % trinitromethane
0.6 % nitric acid
69.4 % water.

The composition of the solution used for the distillating process is denoted in the triangular graph with the letter D. When distilling from this point, the composition constantly remains outside the two phase region.

As will be seen from the diagram, the limit for maintaining a single phase system during distillation follows a line extending between the point Max and the composition 35 % trinitromethane/65 % water, said line extending approximately tangentially to the border line of the bulged portion of the two phase region.

What we claim is:
1. In the method for recovering trinitromethane in the form of an aqueous solution from a solution containing nitric acid, water and trinitromethane, the content of nitric acid of said solution being lower than that corresponding to the content of nitric acid in an azeotropic mixture of nitric acid, water and trinitromethane, by adding water to said solution and then distilling, the improvement which comprises adding water to such an extent that a boundary line represented by a straight line connecting the points of the compositions 67 % nitric acid, 33% water resp. 35% trinitromethane, 65% water in the ternary diagram nitric acid/water/trinitromethane is reached or crossed.

2. The method according to claim 1 wherein the amount of water added to the reflux in the column used for the distillation is increased, if a two phase system occurs in said reflux, until said two phase system is eliminated.

* * * * *